Aug. 4, 1931.  A. A. BYERLEIN  1,817,885
PRESS
Filed April 26, 1929   2 Sheets-Sheet 2
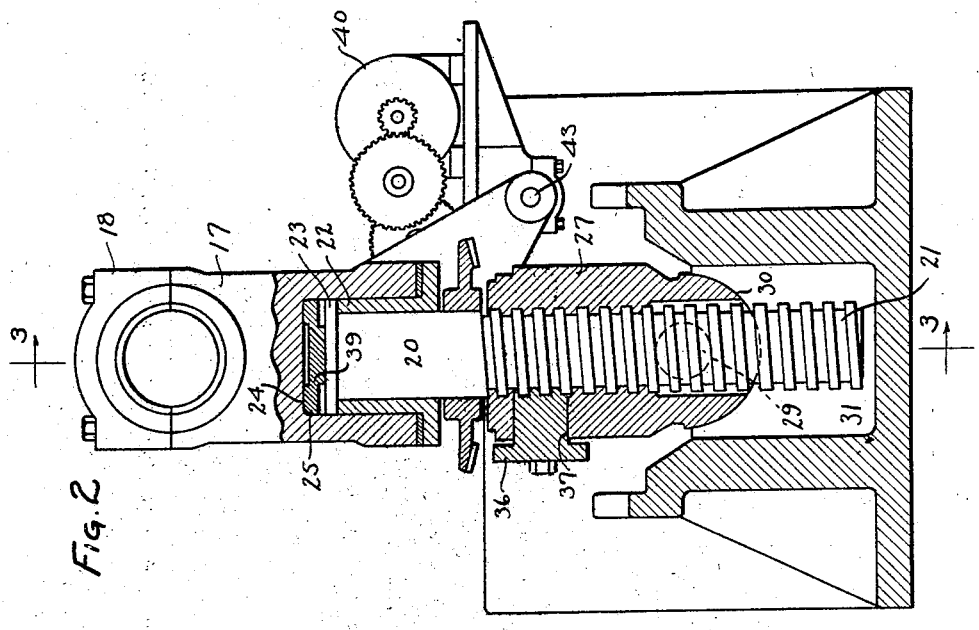
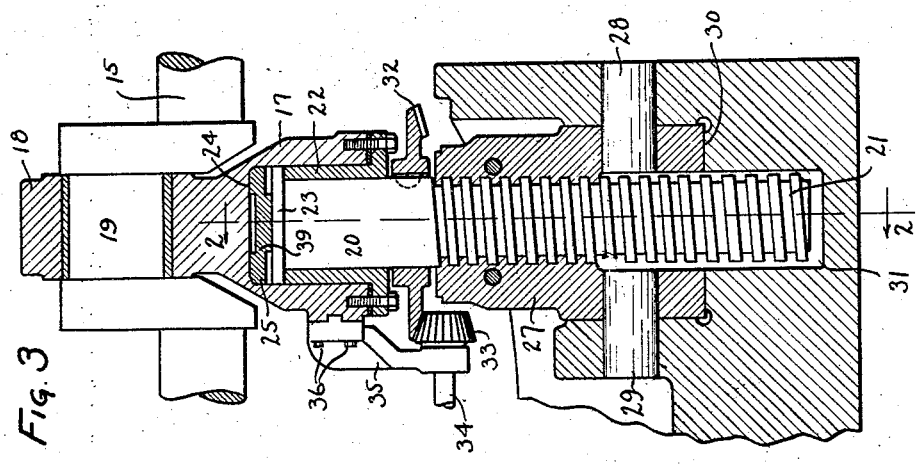
Inventor
Arthur A Byerlein
By Maréchal and Noe
Attorney Patented Aug. 4, 1931

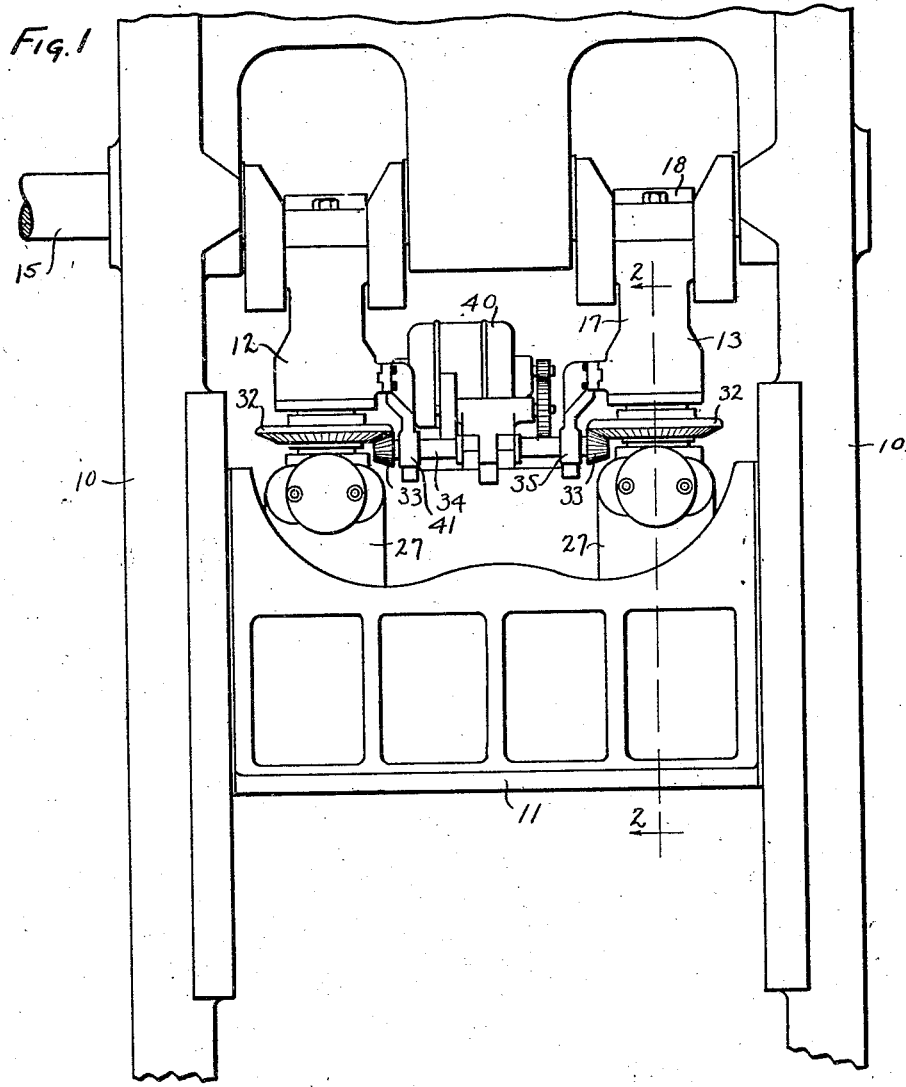

1,817,885

UNITED STATES PATENT OFFICE

ARTHUR A. BYERLEIN, OF DETROIT, MICHIGAN, ASSIGNOR, BY MESNE ASSIGNMENTS, TO GENERAL MACHINERY CORPORATION, OF HAMILTON, OHIO, A CORPORATION OF DELAWARE

PRESS

Application filed April 26, 1929. Serial No. 358,308.

This invention relates to presses, and more particularly to presses having a movable die supporting slide which is adjustably connected to the means which operates it.

One object of the invention is the provision of a press of this character having a connecting rod operably interconnecting the slide and the driving member, the connecting rod being of adjustable length and constructed of parts which are so arranged as to provide for very large adjustment even though the connecting rod itself is not of excessive length.

Another object of the invention is the provision of an adjustable connecting rod connected to a driving member or crank shaft or the like, the connecting rod having a threaded part held operably connected to the end of the rod which is operated by the driving member, this threaded part extending to a position well past the pivotal point of interconnection to the slide.

A further object is the provision of a connecting rod of adjustable length, having a weak member designed to assume all normal compression forces but to break upon overload.

Other objects and advantages of the invention will be apparent from the following description and the accompanying drawings, in which—

Fig. 1 is a front elevation of a portion of a press embodying the present invention;

Fig. 2 is a section on the line 2—2 of Fig. 1; and

Fig. 3 is a section on the line 3—3 of Fig. 2.

In accordance with prior constructions and prior knowledge, large stamping presses have been provided with adjustable parts for properly locating the press bed with respect to the plunger or other slide co-operating therewith. For example the connecting rods which operably interconnect the driving crank shaft and the plunger have been adjustable in length, but only through five or six inches at the most,—a comparatively small amount. This adjustment in length has been provided, for example, by a rotatable threaded screw pivoted to the plunger and threaded to a greater or lesser extent into the top part of the connecting rod which is connected to the crank shaft, the length of this top part therefore determining the amount of adjustment that could be provided. As the length of this top part of the connecting rod is usually very short, only a very small amount of adjustment can be provided in this manner, and consequently the bed of the press must either be made adjustable in height through a considerable range of adjustment, or else spacers or risers must be applied between the bed and the lower die when a stamping of comparatively small height is to be made. Stampings of comparatively small height of course require much thinner dies carried by the slide and the bed than stampings of comparatively large height or thickness, which however, must also be accommodated by the same press.

In accordance with the present invention the plunger or other slide to which the invention is applied is adapted to be adjusted through comparatively large distances, a couple of feet or so,—sufficient to avoid the necessity of employing an adjustable bed or using risers or spacers. Referring to the embodiment of the invention illustrated, 10 designates the frame of a press, only a portion of this frame being shown as it may have any suitable form well known in the art. Guided for reciprocatory movement in the frame 10 is the plunger or other die carrying slide 11. This slide is operated by means of connecting rods 12 and 13 from a suitable driving member, shown in the form of a crank shaft 15 journalled in the press frame and operated in any suitable manner. As the crank shaft 15 is rotated, the connecting rods 12 and 13 will move simultaneously upwardly and downwardly to raise and lower the slide 11.

The connecting rod 13, which is similar in construction to the connecting rod 12, is formed of relatively movable sections preferably in the manner shown in Figs. 2 and 3. The upper end of the connecting rod which is driven by the crankshaft, comprises a part 17 which is connected to a bearing cap 18 and operably connected thereby to the crank shaft throw 19. Rotatably mounted in the lower end of the part 17 is a threaded part or screw 20 of considerable length, the lower end of this part having screw threads 21, and the upper part being rotatably journalled by means of a bushing or sleeve 22 and held thereby against endwise movement relatively to the section 17. The bushing or sleeve 22 is suitably fixed in the lower end of the rod part 17, the upper end of the screw 20 having a flange 23 which rests against the top of the bushing 22. Between the upper end of the screw 20, and the inner wall 24 of the socket which encloses the top of the screw, there is preferably a washer 25 which will be again referred to.

The lower end of the screw 20 is threaded through the interiorly threader part 27, formed preferably as a hollow approximately cylindrical member as shown. The lower end of this part 27 is pivoted to the plunger 11 by pivot pins 28 and 29 which lie on opposite sides of the screw 20. The lower end of the rod 20 is received in a recess 31 in the slide 11 so that the necessary pivotal movements of the connecting rod with relation to the slide may take place. The screw thus extends down well below the pivot connection between the slide and the connecting rod and can therefore be made of very considerable length as it may extend well down towards the bottom of the slide or plunger. The connecting rod is pivoted to the plunger well above the lower end of the latter and the plunger is usually of considerable height so that this permits the use of a screw which is relatively long and which provides for a considerable range of adjustment of the slide. Preferably the lower end of the part 27 is socketed at 30 in the plunger 11 so that downward thrust exerted by the crank shaft is applied to the plunger through this socket thus relieving the pins 28 and 29 from these forces.

As the connecting rod part 27 is pivoted to the slide 11 and in threaded engagement with the screw 20 which is rotatably mounted in the top section 17 of the connecting rod, it will be apparent that rotation of the screw will cause the connecting rod to be increased or decreased in length. To effect rotational movements of the screw 20 the latter is fixed by a suitable key or the like to a member 32, preferably a bevel gear which meshes with a pinion 33 on a suitable shaft 34 journalled on the bracket 35. The bracket 35 is preferably fixed to the section 17 of the connecting rod by bolts 36 or the like. When the shaft 34 is rotated it will be apparent that a change in length of the connecting rod results, the distance between the crank shaft 15 and the lower end of the slide 11 being greatly increased when the screw 20 is so rotated as to be withdrawn to a position where its lower end is somewhat above the top of the pivot pins 28 and 29.

When the desired position of adjustment of the slide is obtained, the screw is fixed definitely against rotational movements and fixed to the part 27 of the connecting rod by means of a plug member 36 or the like which may be threaded at its inner end and which may be inserted in a hole 37 in the side of the upper end of the part 27.

In a connecting rod of the character described the diameter of the screw 20 is quite large so that it will properly withstand the strains it will have to encounter in operation, and to be sufficiently rigid when it is extended considerably. Therefore, when this connection is extended only slightly or in its minimum length position the strength of this screw may be out of proportion with other parts of the press such as the slide, the crank shaft, and the press arch. To provide a weak link in this connection and prevent the fracture or weakening of these various essential parts of the press, the washer 25 is constructed so that it may break when excessive forces are applied to it. The washer 25 is preferably a cast iron part shaped as shown in Fig. 2 so that it bears against the surface 24 of the socket at its peripheral portion only and bears against the top of the threaded rod 20 at only its central portion. The metal of reduced thickness at the part 39 is so designed that it will shear in case an excessive pressure is applied to the slide, and this will protect the various parts of the press mentioned from injury. An upward pull is applied to the slide 11 directly through the bushing or sleeve 22, but unusual pressures are not encountered during the raising movements of the slide. Any downward thrust exerted on the shaft 20 must be through the weak link washer 25, which acts as a transmitting medium for all normal compression forces.

The two connecting rods are simultaneously adjusted as to length preferably by means of an electric motor 40 which may be supported by the bracket 35 on the rod 13 and the bracket 41 on rod 12. These two brackets may support the common shaft 34 which is geared to the two screws, and additional cross interconnections between the two brackets as indicated at 43 in Fig. 2 to provide a support for the motor and the gearing which connects the motor to the shaft 34. The electric motor is of course easily controlled remotely, and when the screw locking plugs 36 are loosened, the two connecting rods are very easily simultaneously adjusted in length so that the particular die which is fastened on the lower end of the slide 11 is properly accommodated.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a press, a driving member, an adjustable length connecting rod operated thereby, a slide operated by said rod, said rod comprising a screw part operably connected to the end of the rod operated by the driving member, and means pivotally connected to said slide in threaded engagement with said part and in which said part is axially movable, said screw extending past the pivotal connection.

2. In a press, a driving member, an adjustable length connecting rod operated thereby, a slide operated by said rod, said rod comprising a plurality of telescoping threaded parts one pivoted to the slide and another operably connected to the driving member, a break member of determined strength in said connecting rod for normally assuming compression forces during operation and adapted to break and flatten upon a predetermined overload.

3. In a device of the class described, a driving member, an adjustable length connecting rod operated thereby, a slide operated by said rod, said connecting rod comprising a pivoted member pivotally connected to said slide and a threaded member operably connected to said driving member and in telescopic threaded engagement with said pivoted member, the length of the threaded member being such that it extends past the pivot axis of the pivoted member when the connecting rod is of minimum length.

4. In a press, a driving member, a connecting rod operated thereby, a slide operated by said rod, said rod comprising a plurality of telescopically related sections, means for limiting extension movement for two of said sections, and a break member of determined strength normally preventing retraction movement of said two sections, said break member being adapted to normally assume compression forces during operation and designed to break and flatten upon a predetermined overload.

5. In a press, a driving member, a connecting rod operated thereby, a slide operated by said rod, said rod comprising a plurality of telescopically related sections, means for limiting extension movement for two of said sections, and a break member of determined strength normally preventing retraction movement of said two sections, said break member comprising a flanged disc adapted to be flattened upon a predetermined overload.

6. In a press, a driving member, an adjustable length connecting rod operated thereby, a slide operated by said rod, said rod comprising an end part engaging said operating member, a screw having a cylindrical portion rotatably journalled in said end part and held against axial movement in said end part, a gear fixed to said cylindrical portion, a bracket detachably mounted on said end part, screw operating means mounted in said bracket and engaging said gear, an internally threaded means pivoted on said slide and in threaded engagement with said screw, said slide having a socket below the pivot axis of said internally threaded means for receiving the end of said screw when the connecting rod is of minimum length.

7. In a press, a rotatable crank shaft, a reciprocable slide member, and an adjustable driving connection between the crank shaft and the slide member having a large range of adjustment so that the slide member may be adjusted a large amount with respect to the crank shaft while the stroke of the slide member remains the same, and a break member of determined strength incorporated in said driving connection and adapted to break upon a predetermined overload and prevent injury to other working parts of the press.

8. In a press, a rotatable crank shaft, a reciprocable slide member, and an adjustable driving connection between the crank shaft and the slide member having a large range of adjustment so that the slide member may be adjusted a large amount with respect to the crank shaft while the stroke of the slide member remains the same, said driving connection including a connecting rod formed of sections and including a break member of determined strength normally rigidifying the sections with respect to one another but adapted to break upon a predetermined overload and prevent injury to other working parts of the press.

In testimony whereof I hereto affix my signature.

ARTHUR A. BYERLEIN.